Jan. 25, 1938. S. R. THORNTON 2,106,669
NUT LOCK
Filed May 7, 1935
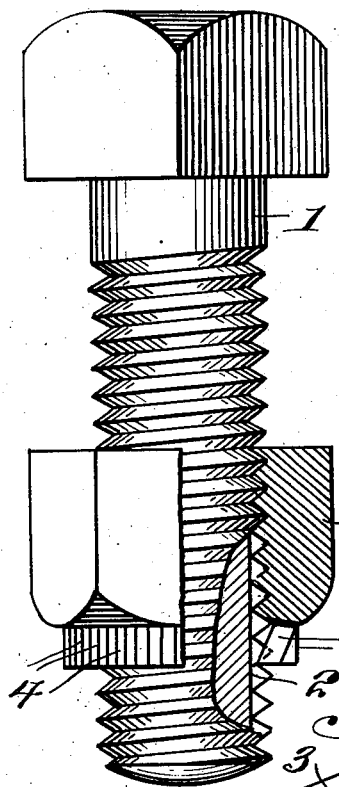
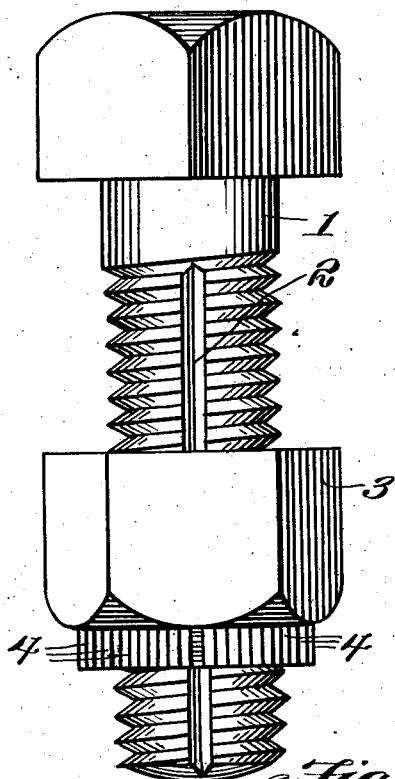
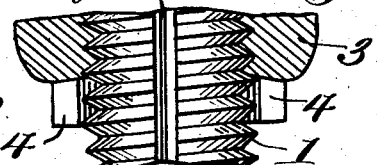
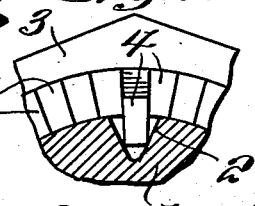
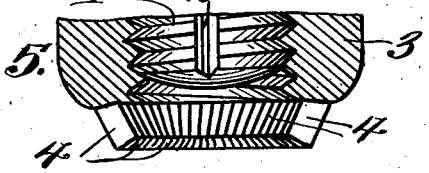
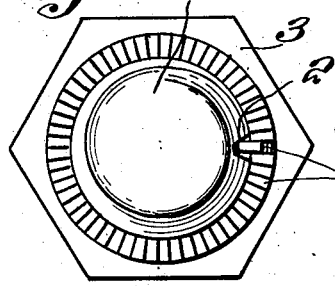
Stuart R. Thornton
INVENTOR Patented Jan. 25, 1938

2,106,669

UNITED STATES PATENT OFFICE 2,106,669

NUT LOCK

Stuart R. Thornton, Oakland, Calif.

Application May 7, 1935, Serial No. 20,235

3 Claims. (Cl. 151—2)

This invention relates to nut locks and has for the primary object the provision of a device of this character which will be self-locking to a bolt as it is threaded onto said bolt and will be prevented from loosening due to vibration and the like and which will be manually turned off of the bolt without injury or destruction thereto or the threads of the bolt.

With these and other objects in view, this invention consists in certain novel features of construction, combination and arrangement of parts to be hereinafter more fully described and claimed.

For a complete understanding of my invention, reference is to be had to the following description and accompanying drawing, in which—

Figure 1 is a side elevation, partly in section, illustrating a nut lock constructed in accordance with my invention.

Figure 2 is a side elevation illustrating a nut lock applied to the bolt.

Figure 3 is an end view showing the nut locked to the bolt.

Figure 4 is a fragmentary sectional view showing the nut threaded to the bolt.

Figure 5 is a detail sectional view showing the nut partially threaded onto the bolt.

Figure 6 is a detail sectional view showing the nut locked to the bolt.

Referring in detail to the drawing, the numeral 1 indicates a screw threaded bolt provided with a longitudinally extending groove 2, the latter having converging walls or being substantially V-shaped.

A nut 3 is threaded onto the bolt and has formed integrally therewith a series of closely related spring fingers 4 grouped in annular formation at one end of the nut and disposed inwardly with respect to the perimeter of said nut. The fingers converge, as shown in Figure 5, in the direction of the free ends so that such free ends have their inner corners arranged slightly within the area of the threaded bore of the nut and the said inner faces of the fingers may or may not be equipped with screw threads to match the screw threads of the bolt. The fingers are, as stated, constructed of resilient material and are capable of flexation so that when the nut is threaded onto the bolt the latter causes a flexing of the fingers and as a finger aligns the groove 2 it will snap into the latter and thereby prevent accidental rotation of the nut on the bolt. Due to the shape of the groove the nut may be turned manually on the bolt in either direction.

Having described the invention, I claim:

1. In combination with a screw threaded bolt having a longitudinally extending groove of V-shaped formation, a nut for cooperating therewith, said nut having closely related and annularly arranged resilient fingers formed integrally with one end thereof and converging in the direction of the bore of the nut having their free ends within the area of the said bore of the nut for a distance at least equalling the depth of the threads of the nut and adapted to be flexed by the nut being threaded onto the bolt so that one after another of said fingers may ride into and out of the groove during the rotation of the nut on the bolt and adapted to secure the nut against accidental rotation on the bolt in either direction by any one of said fingers engaging in the groove.

2. In combination with a bolt having a longitudinal groove interrupting its threads, a nut threaded on the bolt, and an annularly arranged group of closely related resilient fingers formed on and extending from the bore of the nut and exerting a tension in the direction of such bore and against the bolt when the nut is screwed thereon and adapted to ride into and out of the groove of the bolt when the nut is manually turned on the bolt and one of said fingers designed to rest in and contact with the side walls of the groove to prevent accidental turning of the nut when said nut is screwed home.

3. A nut having securing means for use in connection with a threaded bolt having a longitudinal extending groove having its side walls diverging outwardly, said nut having a threaded bore for cooperating with the bolt threads, and an end of said nut having a series of spring fingers normally extending inwardly of the outer periphery of the threads of the bore but yieldable so that their inner surfaces will ride on the tops of the threads of the bolt, and each of said fingers having a width substantially less than the width of the bolt groove at the outer periphery of the bolt threads whereby the fingers will successively ratchet into the bolt groove and rise out of the groove due to the sloping side walls thereof when the nut is on the bolt with the fingers thereof in thread engaging position by yielding to a forced turning thereof.

STUART R. THORNTON.